United States Patent [19]

Asano et al.

[11] 3,929,496

[45] Dec. 30, 1975

[54] HIGH ALUMINA CERAMIC INSULATOR COMPOSITIONS

[75] Inventors: Toshiyasu Asano; Kazuyoshi Sumi, both of Nagoya, Japan

[73] Assignee: NGK Spark Plug Co., Ltd., Nagoya, Japan

[22] Filed: Jan. 20, 1975

[21] Appl. No.: 542,400

Related U.S. Application Data

[63] Continuation of Ser. No. 324,153, Jan. 16, 1973, abandoned.

[30] Foreign Application Priority Data

Jan. 21, 1972  Japan.................................. 47-8657

[52] U.S. Cl.................................. 106/46; 106/73.4
[51] Int. Cl.$^2$......................................... C04B 33/26
[58] Field of Search............................. 106/73.4, 46

[56] References Cited
UNITED STATES PATENTS

| | | |
|---|---|---|
| 1,091,678 | 3/1914 | Locke................................... 106/46 |
| 1,091,679 | 3/1914 | Locke................................... 106/46 |
| 1,120,951 | 12/1914 | Locke................................... 106/46 |
| 2,760,875 | 8/1956 | Schwartzwalder.................... 106/46 |
| 3,019,116 | 1/1962 | Doucette.............................. 106/46 |
| 3,141,786 | 7/1964 | Bugosh............................. 106/73.4 |
| 3,167,438 | 1/1965 | Bristow................................ 106/46 |
| 3,627,547 | 12/1971 | Bailey................................... 106/46 |

*Primary Examiner*—Winston A. Douglas
*Assistant Examiner*—Mark Bell
*Attorney, Agent, or Firm*—Stevens, Davis, Miller & Mosher

[57] ABSTRACT

A high alumina ceramic composition having improved thermal and mechanical properties consists of 80 to 98 percent by weight of alumina of a main constituent and 2 to 20 percent by weight of an accessory constituent, which consists of a mixture of $SiO_2$, $B_2O_3$ and at least one oxide (RO) selected from the group consisting of alkaline earth metal oxides and bivalent metal oxides, said mixture having a composition range encircled with points A, B, C and D in a triangular coordinate.

1 Claim, 1 Drawing Figure

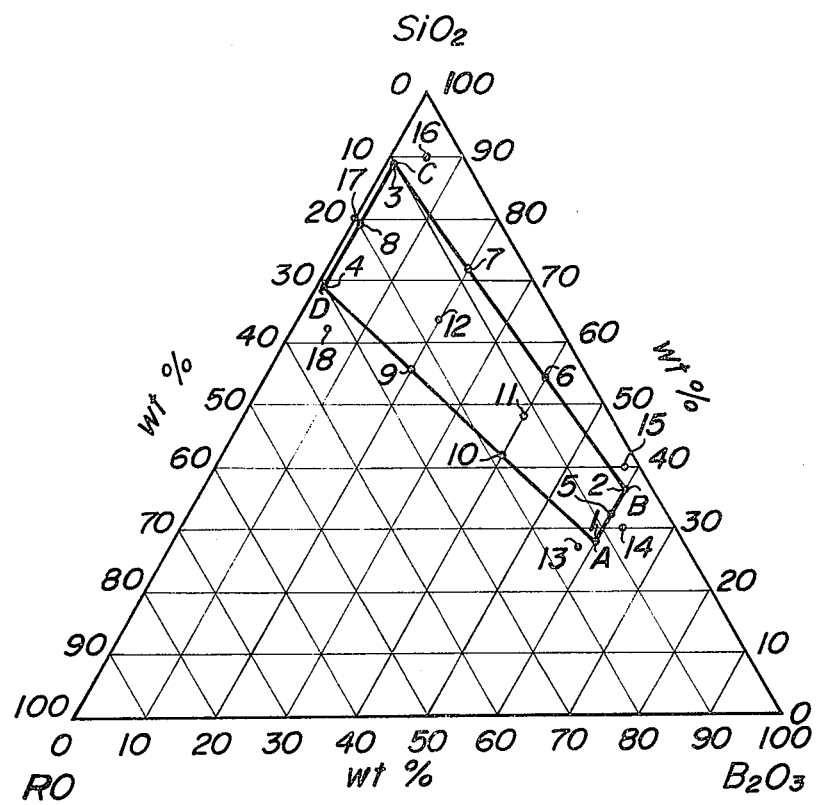

HIGH ALUMINA CERAMIC INSULATOR COMPOSITIONS

This is a continuation of application Ser. No. 324,153 filed Jan. 16, 1973, now abandoned.

The present invention relates to high alumina ceramic compositions.

The high alumina ceramic articles have broadly been used as various high-temperature electric insulating materials because they are high in the mechanical strength, thermal properties and high-temperature insulation resistance and are excellent in the chemical stability. However, when they are used as an insulating body for spark plugs under a severe condition, they are particularly required to have higher mechanical strength and thermal shock resistance.

An object of the present invention is to satisfy the above-described requirements so as to further improve thermal and mechanical properties in the high alumina ceramics.

The present invention provides a high alumina ceramic composition which consists of 80 to 98 percent by weight of alumina of a main constituent and 2 to 20 percent by weight of an accessory constituent consisting of a mixture of $SiO_2$, $B_2O_3$ and at least one oxide (RO) selected from the group consisting of alkaline earth metal oxides of CaO, MgO, BaO, SrO and BeO and bivalent metal oxides of NiO, CdO, ZnO, MnO, CrO and SnO, said mixture having the following composition range encircled with the points A, B, C and D in the triangular coordinate:

|   | $SiO_2$ | $B_2O_3$ | RO |
|---|---|---|---|
| A | 28.0 | 60.0 | 12.0 |
| B | 36.0 | 60.0 | 4.0 |
| C | 89.0 | 1.0 | 10.0 |
| D | 69.0 | 1.0 | 30.0 |

When the amount of alumina is less than 80 percent by weight, the apparent specific gravity, flexural strength and thermal shock resistance are poor, while when the amount of alumina is more than 98 percent by weight, the firing temperature excessively rises and the mass production is not suitable.

The reason why the amount of the accessory constituent is limited to the composition range encircled with the points A, B, C and D in the triangular coordinate is as follows:

When the amount of $B_2O_3$ is greater than the above composition range, the firing temperature excessively rises and the variance of the properties of the resulting products becomes large, while when the amount of $B_2O_3$ is less than the above composition range, the strength of the products is insufficient. Furthermore, it has experimentally been found that a good result is not obtained when the amounts of $SiO_2$ and RO are beyond the above composition range.

The following example is given in illustration of this invention and is not intended as limitations thereof.

EXAMPLE

Ninety four percent by weight of $\alpha$-$Al_2O_3$ powder having a purity of 99.7 percent and approximately 80 to 90 percent of a grain size of less than $2.5\mu$ was mixed with 6 percent by weight of the accessory constituent consisting of a mixture of $SiO_2$, alkaline earth metal oxides of MgO and CaO, and a boron compound, which is converted to $B_2O_3$ by firing, in various composition ranges as shown in the following Table 1, and the resulting mixture was granulated by spray-drying to obtain granules having a grain size of 30 to $250\mu$. These granules were pressed at a pressure of 500 Kg/cm², and the resulting shaped specimen was heated in a gas-fired kiln to 1,300°C. Thereafter, the temperature was raised at a rate of 70°C per hour, while the shaped specimen was taken out at intervals of 20°C during the heating and the fired state was inspected with a fuchsin solution. By such an inspection the temperature was raised up to the point that the stains do not occur, and the firing was completed. The apparent specific gravity, flexural strength and thermal shock resistance were measured with respect to the samples to obtain a result as shown in Table 1.

Table 1

| Sample No. | Main constituent $Al_2O_3$ (Wt.%) | Accessory constituent (Wt.%) | Composition of accessory constituent (Wt.%) | | | | | Characteristic value | | | | Remarks |
|---|---|---|---|---|---|---|---|---|---|---|---|---|
| | | | $SiO_2$ | $B_2O_3$ | CaO | MgO | Total (Metal oxides RO) | Firing temperature (°C) | Apparent specific gravity | Flexural strength (Kg/cm²)×10³ | Thermal shock resistance (°C) | |
| 1 | 94.0 | 6.0 | 28.0 | 60.0 | 8.0 | 4.0 | 12.0 | 1,630 | 3.59 | 4.1 | 740 | Point A of FIG. 1 |
| 2 | " | " | 36.0 | 60.0 | 2.7 | 1.3 | 4.0 | 1,640 | 3.58 | 3.9 | 700 | Point B of FIG. 1 |
| 3 | " | " | 89.0 | 1.0 | 6.7 | 3.3 | 10.0 | 1,600 | 3.67 | 3.8 | 760 | Point C of FIG. 1 |
| 4 | " | " | 69.0 | 1.0 | 20.0 | 10.0 | 30.0 | 1,550 | 3.67 | 4.0 | 760 | Point D of FIG. 1 |
| 5 | " | " | 32.0 | 60.0 | 5.3 | 2.7 | 8.0 | 1,630 | 3.58 | 4.2 | 730 | |
| 6 | " | " | 54.0 | 40.0 | 4.0 | 2.0 | 6.0 | 1,610 | 3.60 | 4.5 | 710 | |
| 7 | " | " | 72.0 | 20.0 | 5.3 | 2.7 | 8.0 | 1,600 | 3.65 | 4.1 | 760 | |
| 8 | " | " | 79.5 | 1.0 | 13.0 | 6.5 | 19.5 | 1,540 | 3.68 | 4.3 | 790 | |
| 9 | " | " | 56.0 | 20.0 | 16.0 | 8.0 | 24.0 | 1,540 | 3.67 | 4.3 | 750 | |
| 10 | " | " | 42.0 | 40.0 | 12.0 | 6.0 | 18.0 | 1,490 | 3.63 | 4.1 | 770 | |
| 11 | " | " | 48.0 | 40.0 | 8.0 | 4.0 | 12.0 | 1,550 | 3.61 | 4.8 | 780 | |
| 12 | " | " | 64.0 | 20.0 | 10.7 | 5.3 | 16.0 | 1,560 | 3.66 | 4.7 | 770 | |
| 13 | 94.0 | 6.0 | 27.5 | 57.5 | 10.0 | 5.0 | 15.0 | 1,600 | 3.60 | 3.4 | 690 | Beyond the scope of the present invention |
| 14 | " | " | 30.0 | 62.5 | 5.0 | 2.5 | 7.5 | 1,650 | 3.57 | 3.5 | 690 | |
| 15 | " | " | 40.0 | 57.5 | 1.7 | 0.8 | 2.5 | 1,640 | 3.58 | 3.2 | 670 | |
| 16 | " | " | 90.0 | 5.0 | 3.3 | 1.7 | 5.0 | 1,650 | 3.67 | 2.8 | 650 | |
| 17 | " | " | 79.5 | 0.5 | 13.3 | 6.7 | 20.0 | 1,540 | 3.68 | 3.3 | 680 | |

Table 1-continued

| Sample No. | Main constituent Al$_2$O$_3$ (Wt.%) | Accessory constituent (Wt.%) | Composition of accessory constituent (Wt.%) | | | | | Characteristic value | | | | Remarks |
|---|---|---|---|---|---|---|---|---|---|---|---|---|
| | | | SiO$_2$ | B$_2$O$_3$ | Metal oxides (RO) | | | Firing temperature (°C) | Apparent specific gravity | Flexural strength (Kg/cm$^2$)×10$^3$ | Thermal shock resistance (°C) | |
| | | | | | CaO | MgO | Total | | | | | |
| 18 | " | " | 62.5 | 5.0 | 21.7 | 10.8 | 32.5 | 1,540 | 3.66 | 3.3 | 660 | |

Note)
Test for flexural strength : The flexural strength was measured with respect to a sample of 50mm×100mm×4mm by means of a Michaelis' tester.
Test for thermal shock resistance : A sample of 70mm×10mm×6mm at room temperature was dipped in a bath of tin melted to 600°C by an electric furnace for 3 seconds, and then taken out therefrom and cooled in air. The cooled sample was subjected to a fuchsin test whether there are damages and cracks or not. If no finding, the bath temperature was raised at a rate of 50°C and the said inspection was repeated. The thermal shock resistance was expressed as an average temperature when the damages and cracks occurred in 10 samples.

As seen from Table 1, when the main constituent Al$_2$O$_3$ is 94 percent by weight and the accessory constituent is 6 percent by weight, the sample Nos. 1 to 12 containing the accessory constituent within the composition range encircled with the points A, B, C and D in the triangular coordinate are excellent in the flexural strength and thermal shock resistance as compared with the sample Nos. 13 to 18 containing the accessory constituent beyond the above described composition range, and particularly the sample Nos. 11 and 12 plotted on the line bonded to each center point Nos. 5 and 8 of lines A–B and C–D have a remarkable effect.

Then, the same test as described above was made with respect to samples prepared according to the sample No. 12 wherein the accessory constituent consisted of 64 percent by weight of SiO$_2$, 20 percent by weight of B$_2$O$_3$ and 16 percent by weight of the metal oxide RO selected from the group consisting of CaO, MgO, ZnO and a combination with other oxide thereof. The obtained results are shown in the following Table 2.

As seen from Table 2, the sample Nos. 12a–12v consisting of 94 percent by weight of the main constituent Al$_2$O$_3$ and 6 percent by weight of the accessory constituent which is a combination of 64 percent by weight of SiO$_2$, 20 percent by weight of B$_2$O$_3$ and 16 percent by weight of RO have satisfactory characteristic values in the firing temperature, apparent specific gravity, flexural strength and thermal shock resistance which are substantially equal to those of Table 1. However, the sample Nos. 18a and 18b prepared by changing the composition of the accessory constituent in the control sample No. 18 cannot attain the given effect, and also the sample No. 14a corresponding to the sample No. 14 is difficult to be fired.

Moreover, the same test as described above was made with respect to samples obtained by varying the mixing ratio of the main constituent Al$_2$O$_3$ and the accessory constituent having the composition range of SiO$_2$, RO and B$_2$O$_3$ corresponding to those of the sample Nos. 5, 8, 11 and 12 of Table 1. The obtained results are shown in the following Table 3.

Table 2

| Sample No. | Main constituent Al$_2$O$_3$ (Wt.%) | Accessory constituent (Wt.%) | Composition of accessory constituent (Wt.%) | | | | | | | Characteristic value | | | | Remarks |
|---|---|---|---|---|---|---|---|---|---|---|---|---|---|---|
| | | | SiO$_2$ | B$_2$O$_3$ | CaO | MgO | Metal oxides (RO) ZnO | Other oxides | Total | Firing Temp. (°C) | Apparent Specific gravity | Flexural strength (Kg/cm$^2$)×10$^3$ | Thermal shock resistance (°C) | |
| 12a | 94.0 | 6.0 | 64.0 | 20.0 | 16.0 | | | | 16.0 | 1,600 | 3.63 | 3.8 | 750 | |
| 12b | " | " | " | " | 8.0 | 8.0 | | | " | 1,550 | 3.65 | 4.2 | 780 | |
| 12c | " | " | " | " | 8.0 | 4.0 | | SnO 4.0 | " | 1,530 | 3.64 | 5.0 | 805 | |
| 12d | " | " | " | " | 8.0 | | | BaO 8.0 | " | 1,630 | 3.68 | 3.9 | 770 | |
| 12e | " | " | " | " | " | | 8.0 | | " | 1,620 | 3.67 | 4.7 | 740 | |
| 12f | " | " | " | " | " | | | CdO 8.0 | " | 1,650 | 3.65 | 3.8 | 730 | |
| 12g | " | " | " | " | " | | | NiO 8.0 | " | 1,590 | 3.67 | 4.2 | 760 | |
| 12h | " | " | " | " | " | | | MnO 8.0 | " | 1,600 | 3.66 | 3.8 | 760 | |
| 12i | " | " | " | " | " | | | SrO 8.0 | " | 1,590 | 3.64 | 3.6 | 810 | |
| 12j | " | " | " | " | " | | 4.0 | SrO 4.0 | " | 1,650 | 3.64 | 3.7 | 750 | |
| 12k | " | " | " | " | " | | | BeO 8.0 | " | 1,630 | 3.67 | 4.0 | 750 | |
| 12l | " | " | " | " | " | | | SnO 8.0 | " | 1,680 | 3.68 | 4.0 | 708 | |
| 12m | " | " | " | " | | 16.0 | | | " | 1,500 | 3.66 | 4.7 | 780 | |
| 12n | " | " | " | " | | 8.0 | | SrO 8.0 | " | 1,530 | 3.66 | 4.7 | 790 | |
| 12o | " | " | " | " | | " | | BaO 8.0 | " | 1,530 | 3.68 | 4.5 | 770 | |
| 12p | " | " | " | " | | " | 8.0 | | " | 1,570 | 3.61 | 4.1 | 750 | |
| 12q | " | " | " | " | | " | | NiO 8.0 | " | 1,600 | 3.62 | 4.0 | 750 | |
| 12r | " | " | " | " | | | 16.0 | | " | 1,700 | 3.56 | 3.8 | 710 | |
| 12s | " | " | " | " | | | 8.0 | BaO 8.0 | " | 1,690 | 3.60 | 3.8 | 710 | |
| 12t | " | " | " | " | | | " | SrO 8.0 | " | 1,670 | 3.57 | 4.0 | 740 | |
| 12u | " | " | " | " | | | " | NiO 8.0 | " | 1,670 | 3.60 | 3.6 | 700 | |
| 12v | " | " | " | " | | | " | MnO 8.0 | " | 1,620 | 3.66 | 4.5 | 740 | |
| 14a | 94.0 | 6.0 | 30.0 | 62.5 | 3.8 | 3.7 | | | 7.5 | above 1,720 | — | — | — | Beyond the scope of the present invention |
| 18a | " | " | 62.5 | 5.0 | 16.3 | 16.2 | | | 32.5 | 1,610 | 3.66 | 3.7 | 650 | |
| 18b | " | " | " | " | " | " | | SrO 16.2 | 32.5 | 1,590 | 3.65 | 3.2 | 690 | |

Table 3

| Sample No. | Main constituent Al$_2$O$_3$ (Wt.%) | Accessory constituent (Wt.%) | Composition of accessory constituent (Wt.%) | | | | | Characteristic value | | | | Remarks |
|---|---|---|---|---|---|---|---|---|---|---|---|---|
| | | | SiO$_2$ | B$_2$O$_3$ | CaO | MgO | Total (Metal oxides RO) | Firing Temp. (°C) | Apparent specific gravity | Flexural strength (Kg/cm$^2$) ×10$^3$ | Thermal shock resistance | |
| 5a' | 75.0 | 25.0 | 32.0 | 60.0 | 5.3 | 2.7 | 8.0 | 1,410 | 2.8 | 1.9 | 560 | Beyond |
| 8a' | " | " | 79.5 | 1.0 | 13.0 | 6.5 | 19.5 | 1,420 | 3.1 | 2.2 | 600 | the scope |
| 11a' | " | " | 48.0 | 40.0 | 8.0 | 4.0 | 12.0 | 1,390 | 2.9 | 2.6 | 610 | of the present |
| 12a' | " | " | 64.0 | 20.0 | 10.7 | 5.3 | 16.0 | 14,000 | 3.0 | 2.4 | 600 | invention |
| 5b' | 80.0 | 20.0 | 32.0 | 60.0 | 5.3 | 2.7 | 8.0 | 1,460 | 2.9 | 2.6 | 620 | |
| 8b' | " | " | " | 79.5 | 1.0 | 13.0 | 6.5 | 19.5 | 1,430 | 3.2 | 2.7 | 660 |
| 11b' | " | " | 48.0 | 40.0 | 8.0 | 4.0 | 12.0 | 1,410 | 3.0 | 3.0 | 660 | |
| 12b' | " | " | 64.0 | 20.0 | 10.7 | 5.3 | 16.0 | 1,430 | 3.1 | 3.0 | 670 | |
| 5c' | 85.0 | 15.0 | 32.0 | 60.0 | 5.3 | 2.7 | 8.0 | 1,510 | 3.1 | 2.9 | 650 | |
| 8c' | " | " | 79.5 | 1.0 | 13.0 | 6.5 | 19.5 | 1,480 | 3.4 | 3.1 | 690 | |
| 11c' | " | " | 48.0 | 40.0 | 8.0 | 4.0 | 12.0 | 1,440 | 3.3 | 3.4 | 700 | |
| 12c' | " | " | 64.0 | 20.0 | 10.7 | 5.3 | 16.0 | 1,460 | 3.3 | 3.5 | 690 | |
| 5d' | 90.0 | 10.0 | 32.0 | 60.0 | 5.3 | 2.7 | 8.0 | 1,560 | 3.4 | 3.4 | 700 | |
| 8d' | " | " | 79.5 | 1.0 | 13.0 | 6.5 | 19.5 | 1,500 | 3.5 | 3.8 | 760 | |
| 11d' | " | " | 48.0 | 40.0 | 8.0 | 4.0 | 12.0 | 1,490 | 3.4 | 4.0 | 740 | |
| 12d' | " | " | 64.0 | 20.0 | 10.7 | 5.3 | 16.0 | 1,480 | 3.5 | 4.1 | 740 | |
| 5 | 94.0 | 6.0 | 32.0 | 60.0 | 5.3 | 2.7 | 8.0 | 1,630 | 3.6 | 4.2 | 730 | |
| 8 | " | " | 79.5 | 1.0 | 13.0 | 6.5 | 19.5 | 1,540 | 3.7 | 4.3 | 790 | |
| 11 | " | " | 48.0 | 40.0 | 8.0 | 4.0 | 12.5 | 1,550 | 3.6 | 4.8 | 780 | |
| 12 | " | " | 64.0 | 20.0 | 10.7 | 5.3 | 16.0 | 1,560 | 3.7 | 4.7 | 770 | |
| 5e' | 98.0 | 2.0 | 32.5 | 60.0 | 5.3 | 2.7 | 8.0 | 1,700 | 3.8 | 3.5 | 660 | |
| 8e' | " | " | 79.5 | 1.0 | 13.0 | 6.5 | 19.5 | 1,640 | 3.8 | 3.7 | 690 | |
| 11e' | " | " | 48.0 | 40.0 | 8.0 | 4.0 | 12.5 | 1,660 | 3.8 | 4.2 | 720 | |
| 12e' | " | " | 64.0 | 20.0 | 10.7 | 5.3 | 16.0 | 1,680 | 3.8 | 4.0 | 700 | |
| 5f' | 99.0 | 1.0 | 32.5 | 60.0 | 5.3 | 2.7 | 8.0 | 1,710 above | — | — | — | Beyond the |
| 8f' | " | " | 79.5 | 1.0 | 13.0 | 6.5 | 19.5 | 1,710 above | 3.8 | 2.9 | 640 | scope of |
| 11f' | " | " | 48.0 | 40.0 | 8.0 | 4.0 | 12.5 | 1,710 above | — | — | — | the present |
| 12f' | " | " | 54.0 | 20.0 | 10.7 | 5.3 | 16.0 | 1,610 | — | — | — | invention |

As seen from Table 3, the compositions consisting of 80 to 98 percent by weight of alumina and 2 to 20 percent by weight of the accessory constituent (sample Nos. 5b'–12b' to 5e'–12e') have the substantially same characteristic values as those of the sample Nos. 5–12 of Table 1. On the other hand, the compositions consisting of 75 percent by weight of alumina and 25 percent by weight of the accessory constituent (sample Nos. 5a'–12a') are low in the apparent specific gravity, flexural strength and thermal shock resistance, while in case of the compositions consisting of 99 percent by weight of alumina and 1 percent by weight of the accessory constituent (sample Nos. 5f'–12f') the firing temperature excessively rises and the mass production is not suitable.

FIG. 1 is a triangular coordinate showing a composition range of three component system, i.e., SiO$_2$, B$_2$O$_3$ and at least one oxide (RO) selected from the group consisting of alkaline earth metal oxides of CaO, MgO, BaO, SrO and BeO and bivalent metal oxides of NiO, CdO, ZnO, MnO, CrO and SnO, which constitutes the accessory constituent of the high alumina ceramic composition according to the present invention.

As seen from the above Tables 1, 2 and 3, the high alumina ceramic compositions of the present invention consisting of 80 to 98 percent by weight of the main constituent Al$_2$O$_3$ and 2 to 20 percent by weight of the accessory constituent consisting of a mixture of SiO$_2$, B$_2$O$_3$ and at least one oxide RO having the composition range encircled with the points A, B, C and D in the triangular coordinate have an excellent effect of improving mechanical strength, flexural strength and thermal shock resistance required for the manufacture of high-temperature electric insulating materials without raising the firing temperature.

According to the present invention, the reason why at least one oxide RO is selected from the group consisting of alkaline earth metal oxides of CaO, MgO, BaO, SrO and BeO and bivalent metal oxides of NiO, CdO, ZnO, MnO, CrO and SnO is based on the experimental results. That is, it is well-known that in the alumina ceramics, aluminosilicate glass as a main component of grain boundary has a higher thermal expansion coefficient than that of alumina grains, but borosilicate glass added with B$_2$O$_3$ becomes smaller in the thermal expansion coefficient. Therefore, the inventors have considered that when such a borosilicate glass is added with a network modifier having a large ionic radius and a small electric charge, the thermal expansion coefficient will be further lowered and the thermal shock resistance will be increased. For this purpose, an experiment was made with respect to MgO having an ionic radius/valence ratio of 0.39 and CaO having an ionic radius/valence ratio of 0.53 and the results shown in Table 1 were obtained. Further, when the experiment was made with respect to the other alkaline earth metal oxides and further to bivalent metal oxides having an approximately equal ionic radius/valence ratio which do not cause considerable coloration to fired body nor degrade insulation resistance, the desired results were obtained.

Moreover, as the network modifier there are alkali metal ions such as K, Na, Li and the like, but these ions considerably degrade the insulation resistance, so that they cannot be used as the accessory constituent of the present invention.

For the reference, ionic radii and valences of alkaline earth metals and bivalent metals are shown in the following Table 4.

Table 4

| Metal | A | Ionic radius Valence | radius/va-lence | Ionic |
|---|---|---|---|---|
| Alkaline earth | Be | 0.3 | 2 | 0.15 |
|  | Mg | 0.78 | " | 0.39 |
|  | Ca | 1.06 | " | 0.53 |
|  | Sr | 1.27 | " | 0.64 |
|  | Ba | 1.47 | " | 0.72 |
| Bivalent | Ni | 0.78 | 2 | 0.39 |
|  | Cd | 1.03 | " | 0.53 |
|  | Zn | 0.83 | " | 0.42 |
|  | Mn | 0.91 | " | 0.45 |
|  | Cr | 0.64 | " | 0.32 |
|  | Sn | 0.74 | " | 0.37 |

In the metal oxide expressed by RO, metals such as Ni, Mn, etc. capable of forming trivalent or polyvalent oxides are included, but when these oxides other than bivalent oxide are used, they may be calculated as bivalent oxide.

What is claimed is:

1. An alumina ceramic insulator for use in a spark plug, formed by sintering at a temperature of 1410°C to 1700°C a mixture of 80 to 98 percent by weight of alumina of a main constituent and 2 to 20 percent by weight of flux material of an accessory constituent consisting of $SiO_2$, $B_2O_3$ and at least one oxide (RO) selected from the group consisting of alkaline earth metal oxides of CaO, MgO, BaO, SrO and BeO and bivalent metal oxides of NiO, CdO, ZnO, MnO, CrO and SnO, said flux material having the following composition range encircled with the points A, B, C and D in the triangular coordinate:

|   | $SiO_2$ | $B_2O_3$ | RO |
|---|---|---|---|
| A | 28.0 | 60.0 | 12.0 |
| B | 36.0 | 60.0 | 4.0 |
| C | 89.0 | 1.0 | 10.0 |
| D | 69.0 | 1.0 | 30.0 |

* * * * *